United States Patent
Merschon et al.

(10) Patent No.: US 9,625,993 B2
(45) Date of Patent: Apr. 18, 2017

(54) TOUCH FREE OPERATION OF DEVICES BY USE OF DEPTH SENSORS

(75) Inventors: Asaf Merschon, Maor (IL); Assaf Govari, Haifa (IL); Andres Claudio Altmann, Haifa (IL); Yitzhack Schwartz, Haifa (IL)

(73) Assignee: Biosense Webster (Israel) Ltd. (IL)

( * ) Notice: Subject to any disclaimer, the term of this patent is extended or adjusted under 35 U.S.C. 154(b) by 373 days.

(21) Appl. No.: 13/347,943

(22) Filed: Jan. 11, 2012

(65) Prior Publication Data

US 2013/0179162 A1    Jul. 11, 2013

(51) Int. Cl.
*G10L 15/00*    (2013.01)
*G06K 9/00*    (2006.01)
*G06F 3/01*    (2006.01)
*G06F 3/03*    (2006.01)

(52) U.S. Cl.
CPC ............ G06F 3/017 (2013.01); G06F 3/0304 (2013.01)

(58) Field of Classification Search
CPC ....................................... G06F 3/167
USPC .......................................... 704/231
See application file for complete search history.

(56) References Cited

U.S. PATENT DOCUMENTS

| | | | |
|---|---|---|---|
| 6,243,683 B1* | 6/2001 | Peters ................ | G10L 15/24 434/4 |
| 6,368,269 B1* | 4/2002 | Lane ................... | A61B 1/042 200/201 |
| 7,835,498 B2 | 11/2010 | Bonfiglio et al. | |
| 2001/0039415 A1 | 11/2001 | Francischelli et al. | |
| 2004/0036574 A1 | 2/2004 | Bostrom | |
| 2008/0273755 A1 | 11/2008 | Hildreth | |
| 2009/0079813 A1 | 3/2009 | Hildreth | |
| 2009/0228841 A1 | 9/2009 | Hildreth | |

(Continued)

FOREIGN PATENT DOCUMENTS

| | | |
|---|---|---|
| CN | 101119680 A | 2/2008 |
| JP | 2008-529707 A | 8/2008 |

(Continued)

OTHER PUBLICATIONS

Craig Feied et al., A-Real time Gesture interface for hands-free Control of Electronic Medical Records, AMIA 2006 Symposium Proceedings p. 920.*

(Continued)

*Primary Examiner* — David Hudspeth
*Assistant Examiner* — Timothy Nguyen

(57) ABSTRACT

An inventive system and method for touch free operation of a device is presented. The system can comprise a depth sensor for detecting a movement, motion software to receive the detected movement from the depth sensor, deduce a gesture based on the detected movement, and filter the gesture to accept an applicable gesture, and client software to receive the applicable gesture at a client computer for performing a task in accordance with client logic based on the applicable gesture. The client can be a mapping device and the task can be one of various mapping operations. The system can also comprise hardware for making the detected movement an applicable gesture. The system can also comprise voice recognition providing voice input for enabling the client to perform the task based on the voice input in conjunction with the applicable gesture. The applicable gesture can be a movement authorized using facial recognition.

25 Claims, 4 Drawing Sheets

(56) References Cited

U.S. PATENT DOCUMENTS

| | | | |
|---|---|---|---|
| 2009/0281809 A1* | 11/2009 | Reuss | G10L 17/24 |
| | | | 704/273 |
| 2010/0013764 A1 | 1/2010 | Gu et al. | |
| 2010/0228119 A1 | 9/2010 | Brennan et al. | |
| 2010/0231509 A1 | 9/2010 | Boillot et al. | |
| 2010/0277489 A1* | 11/2010 | Geisner | G06F 3/011 |
| | | | 345/581 |
| 2010/0280363 A1* | 11/2010 | Skarda | A61B 1/00135 |
| | | | 600/424 |
| 2011/0007142 A1* | 1/2011 | Perez | G06F 3/017 |
| | | | 348/77 |
| 2011/0254846 A1 | 10/2011 | Lee et al. | |
| 2011/0313768 A1* | 12/2011 | Klein | G06F 3/017 |
| | | | 704/251 |
| 2012/0089392 A1* | 4/2012 | Larco | G10L 15/063 |
| | | | 704/231 |
| 2012/0093360 A1 | 4/2012 | Subramanian et al. | |
| 2014/0007225 A1 | 1/2014 | Gay et al. | |

FOREIGN PATENT DOCUMENTS

| | | |
|---|---|---|
| JP | 2011-517357 A | 6/2011 |
| JP | 2011-232964 A | 11/2011 |
| WO | WO 2007/127338 A2 | 11/2007 |
| WO | WO 2009/137688 A2 | 11/2009 |
| WO | WO 2011/123669 A1 | 10/2011 |

OTHER PUBLICATIONS

Hongo, Hitoshi et al., Person Detecting Method, Person Detecting Device, and Control System Using It, Dec. 15, 2000; JP02000347692A_Abstract in English.*

Hongo_Japan Patent Application JP11-159882, Person detecting method, device, and system, Dec. 15, 2000, Machine translation version.*

Wachs, Juan P. et al., "A Gesture-based Tool for Sterile Browsing of Radiology Images", Journal of the American Medical Informatics Association, vol. 15, No. 3, May/Jun. 2008, pp. 321-323.

Feied, Craig et al., "A Real-Time Gesture Interface for Hands-Free Control of Electronic Medical Records", AMIA 2006 Symposium Proceedings, 2006, p. 920.

Wachs, Juan et al., "Real-Time Hand Gesture Interface for Browsing Medical Images", IC-MED, vol. 1, Mo. 3, Issue 1, pp. 175-185.

"Hand Gesture Interface for Medical Visualization Applications (Gestix)", http://www.movesinstitutes.org/~jpwachs/gestix/gesture.html, printed Jun. 22, 2011.

Office Action dated Oct. 8, 2013 received in a related U.S. Patent Application, namely U.S. Appl. No. 13/347,987.

Office Action dated Mar. 20, 2014 received in a related U.S. Patent Application, namely U.S. Appl. No. 13/347,987.

Office Action dated Aug. 14, 2014 received in a related U.S. Patent Application, namely U.S. Appl. No. 13/347,987.

Office Action dated Mar. 26, 2015 received in a related U.S. Patent Application, namely U.S. Appl. No. 13/347,987.

EP Examination Report received Sep. 8, 2014 for counterpart Application No. EP13150838.4.

Patent Examination Report dated Nov. 2, 2015 received from the Australian Patent Office in related Australian Patent Application 2013200054.

Patent Examination Report dated Oct. 12, 2015 received from the Australian Patent Office in related Australian Patent Application 2013200054.

Patent Examination Report dated Sep. 17, 2014 received from the Australian Patent Office in related Australian Patent Application 2013200054.

European Search Report dated Apr. 16, 2013 for related European Patent Application No. 13150838.4.

Australian Exam Report dated Sep. 17, 2014 for related Australian Application No. 2013200053.

European Search Report dated Apr. 16, 2016 from corresponding European Patent Application No. 13150837.6.

Japanese Notification of Reasons for Refusal dated Aug. 30, 2016 from related Japanese Patent Application No. 2013-002425.

Japanese Notification of Reasons for Refusal dated Aug. 30, 2016 from corresponding Japanese Patent Application No. 2013-002419.

Chinese First Office Action dated Oct. 10, 2016 from related Chinese Patent Application No. 201310011537.3.

Chinese First Office Action dated Sep. 20, 2016 from corresponding Chinese Patent Application No. 201310009173.5.

* cited by examiner

TOUCH FREE OPERATION OF DEVICES BY USE OF DEPTH SENSORS

CROSS-REFERENCE TO RELATED APPLICATIONS

This application is related to commonly-owned, co-pending U.S. patent application Ser. No. 13/347,987 for TOUCH FREE OPERATION OF ABLATOR WORKSTATION BY USE OF DEPTH SENSORS, filed on Jan. 11, 2012, the entire contents and disclosure of which is expressly incorporated by reference herein as if fully set forth herein.

FIELD OF THE INVENTION

The present invention relates generally to touch free operation of operating room devices by using depth sensors and, in some situations, voice recognition.

BACKGROUND OF THE INVENTION

In an operating room, the physician needs to stay sterile; hence he or she cannot physically access a computer for assistance during surgery. Accordingly, any task the physician wants to perform using computer applications on operating room devices, such as 3D mapping systems, e.g., CARTO®, must actually be performed by another. There is a need for the physician to be able to operate these devices without physically touching the device or its accessories, e.g., its keyboard, screen, mouse, etc.

SUMMARY OF THE INVENTION

An inventive system and method for touch free operation of a device is presented. The system comprises a depth sensor for detecting a movement, a motion software module operable to receive the detected movement from the depth sensor, deduce a gesture based on the detected movement, and filter the gesture to accept an applicable gesture, and a client software module operable to receive the applicable gesture at a client computer for performing a task in accordance with client logic based on the applicable gesture.

In one aspect, the client is a mapping device and the task is one of rotating a map, zooming in on a map, tilting a map, and panning a map. In one aspect, the movement is at least one of a head motion, a hand motion and a body motion and the gesture is further deduced based on a short history. In one aspect, the system further comprises hardware for making the detected movement an applicable gesture. In one aspect, the applicable gesture is one or more of the detected movement performed by a user determined to be authorized using facial recognition, and a recognized gesture in accordance with the client logic. In one aspect, filtering of the gesture is performed by determining whether the gesture is authorized and valid. In one aspect the system further comprises a client communication module for receiving the application gesture at the client computer. In one aspect, the system further comprises voice recognition providing voice input for enabling the client to perform the task based on the voice input in conjunction with the applicable gesture.

An inventive method for touch free operation of a device comprises detecting a movement using a depth sensor, deducing, using a CPU, a gesture based on the detected movement, filtering the gesture to accept an applicable gesture, receiving the applicable gesture at a client, and performing a task in accordance with client logic based on the applicable gesture.

A computer readable storage medium storing a program of instructions executable by a machine to perform one or more methods described herein also may be provided.

BRIEF DESCRIPTION OF THE DRAWINGS

The present invention will be more fully understood from the following detailed description of the embodiments thereof, taken together with the drawings. Further features as well as the structure and operation of various embodiments are described in detail below with reference to the accompanying drawings. In the drawings, like reference numbers indicate identical or functionally similar elements.

DETAILED DESCRIPTION

An inventive technique for touch free operation of a device is presented. In accordance with this novel technology, a person can perform the device functions without touching any computer apparatus, e.g., a monitor, a keyboard, a mouse, etc.

Figure 1:
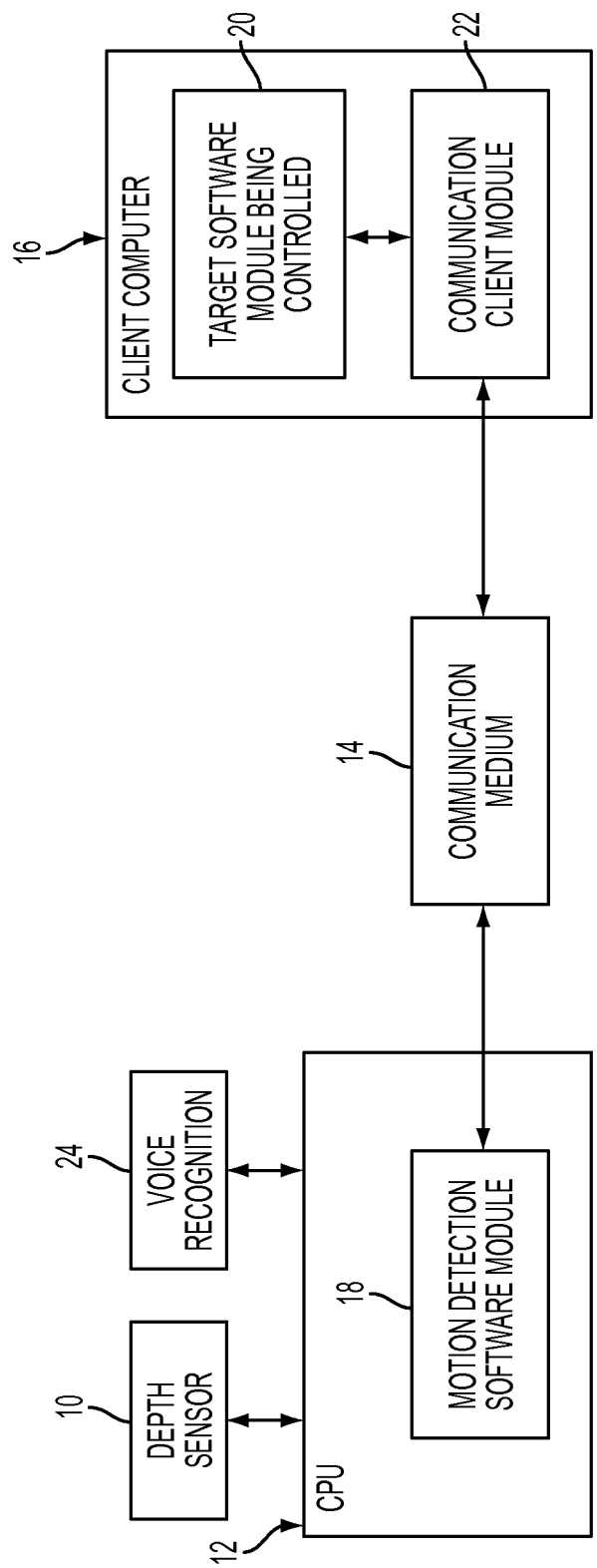
FIG. 1 is a block diagram of an embodiment of the inventive system.

As shown in FIG. 1, the system in one embodiment comprises various components including a depth sensor 10, a computer or CPU 12, a communication medium 14 and a client computer 16. A Motion Detection Software Module 18 can reside in the CPU 12. The client computer 16 can control a Target Software Module 20. A Communication Client Module 22 can reside in the client computer 16. In one embodiment, the system can also include voice recognition, such as a microphone or a microphone array 28.

The depth sensor 10 typically includes a depth-aware camera that not only records images but also records depth, allowing 3D representation of the recorded images. As is known to one skilled in the art, a depth sensor is connected to a computer which uses the depth map from the sensor to deduce motion, e.g., hand gestures, poses and positions of a user. In a medical setting, the user can be the system operator, generally a physician. In one embodiment of the present invention, the depth sensor tracks movements of the head as well as the hands. In another embodiment, the depth sensor tracks not only the hands and head but also the overall body location, such as movement toward and/or away from the computer screen or monitor. In one embodiment, the depth sensor 10 can be implemented using modules or middleware such as Microsoft® Kinect, ASUS® Xtion PRO, or ASUS® Xtion PRO LIVE. More than one depth sensor can be used in parallel to extend occlusion handling, field of view and accuracy. Any sensor, such as a camera which can provide a depth map with sufficient detail in real time may be fitted for use with the inventive system. The depth sensor obtains location information and forwards this information to CPU 12 for processing as discussed below. As is known to one skilled in the art, software and a driver provided by the depth sensor 10 can be used to obtain this location information.

The Motion Detection Software Module or Motion Software 18 in the CPU 12 obtains the location information, such as locations of the operator's relevant body parts, e.g., hand, head, feet, etc., a few times a second, from the depth sensor 10. Each received motion and/or body location is tracked and saved to a short history of movements file or data set.

The motion software can include software that uses the data detected as movements of the body parts from the motion software 18 along with the short history of movements data to deduce more complex movements and process the data into significant gestures, such as a motion forward, a circular motion of the hand, or a nod with the head. For example, linear movements and/or circular movements of the hand are detected and parameters are calculated to quantify these movements. The motion software associates particular attributes, such as the extent of the movement, the time it was captured, its speed and/or duration, etc., with each gesture.

The system can be associated with a specific user by using body tracking, that is, starting from an initial configuration, tracking a user's individual movements, and ensuring that only motions by that specific user are responded to. For example, locations of the body and movements are tracked and so long as the differences from locations in the previous frame are small enough, the movements are assumed to be the same person. The system can also be associated with a specific user by employing face detection and/or recognition with the camera in the depth sensor. The system can use face detection and/or recognition to verify that the body is the one associated with the recognized face in each state or position. These techniques can be combined, for example, using body tracking while the movements are small and, whenever there is an uncertainty, using face detection and/or recognition to find the correct user, and then continue as before.

The Motion Detection Software Module 18 can also include a filter that can decide which motions or movements to accept and which need to be ignored or filtered out as not applicable, e.g., invalid and/or unauthorized. An invalid, e.g., irrelevant, motion can be a motion that is not acceptable to the Motion Detection Software Module 18. For example, if a motion is too small or slow to filter uncontrollable natural movements of the user, then this motion would be invalid or irrelevant. An unauthorized motion is a motion that is not performed by the proper user and/or not performed in accordance with predetermined conditions. For example, for safety and/or security, certain motions can require physical input and/or interaction with a corresponding hardware device, such as the pressing of a foot pedal during a particular hand motion and/or at a given time during the procedure. In one embodiment when multiple cameras are used and one camera has a view of the physician's full body, it could be determined whether the specific physician provided the appropriate physical input. This security measure, e.g., requiring physical input in addition to detected motions, trusts that the people in the room are not trying to tamper with the system; instead, the security measure provides extra security to prevent critical functions from happening unintentionally, in case the physician/user made some gesture by mistake.

Connecting a hardware device to the system can prevent unwanted actions by the system, as indicated above. This can be critical in medical software. The hardware device (not shown), e.g., a foot pedal, could be connected to the client computer 16 which it is responsible for receiving and interpreting the device actions, e.g., foot pedal presses, etc., and using these actions for the internal logic of the client. The hardware device could also be connected to the CPU 12 doing the motion detection and its software in which case the device state could be sent with the motions detected and/or some motions could be filtered according to the state of the device.

The motions not filtered out are sent through the communication medium 14 to the communications client module 22 at the client computer 16. The communication medium 14 can be a serial, local area network (LAN), wireless LAN (WLAN), Bluetooth, wireless, etc.

The client computer 16 receives the interpreted motions, e.g., gesture. The Target Software Module 20 determines if the received motion is valid. An invalid motion can be a motion that is not defined within the Target Software Module 20. For example, if a CARTO® client software module were active, then a motion toward the screen can be defined to tilt the map, but if another client were active, this motion toward the screen may not be defined so that this motion would be inappropriate or irrelevant. In addition, an invalid motion can be one that is not permitted unless certain preconditions are met. For example, when a hardware device is connected to the client computer, a motion can be permitted or valid only when it is performed in conjunction with an action of the hardware device; for example, a wave motion may only be valid when it is performed while a foot pedal of a hardware device is pressed.

Client logic, e.g., Target Software Module 20, determines how to respond to each recognized, e.g., valid, gesture. For example, if the Target Software Module 20 is graphic software that creates and displays a three dimensional (3D) map, the client logic may be able to perform tasks such as rotating the map, zooming in on a portion of the map, tilting the map, etc. Accordingly, the client software may determine, using its logic, that if the gesture is a circular motion, the client logic can perform the task of rotating the map, and if the gesture is a pushing motion, the client logic can perform the task of tilting the map away from the user, etc.

To operate the inventive system, the user must first gain control and activate touch free operation. To gain control, the user makes the system acknowledge that the user will be sending instructions. The system then responds to the instructions which are, as discussed above, in the form of different hand gestures and/or head and/or other body movements. Control can be released when it is no longer needed or after a period of motionlessness is detected. Gaining control can be achieved by either using a focusing gesture, for example, a hand wave or head movement, or by use of hardware, such as a foot pedal that enables control while pressed, or by a voice command.

The motions detected by the system do not have fixed functions. The system associates meaning to each gesture, pose or movement depending on its context according to the function and mode in which the user is currently operating the client computer 16. In one embodiment, the client can be a 3D mapping system with 3D mapping logic as the Target Software Module. In this case, for example, while the user is operating the client in review mode, a head movement may rotate the map, and while the client is constructing a 3D model with Fast Anatomical Mapping (FAM), a head movement may pan the map. In addition, a gesture can select electroanatomical points in the 3D map or the points list (which contains all of the points comprising the map).

Additional meanings that can be associated to gestures can include selecting an ECG channel and altering its properties (the gain of the channel) or notations.

During the time that the touch free control is activated, a visual indication can be shown to the user. Optionally, an audible indication may be given upon activation and deactivation of the touch free control.

In one embodiment, the hands free operation can be augmented with voice input which could be used separately or in conjunction with detected motions. Microsoft® Kinect, for example, has peripheral microphones and can detect the direction from which the voice recognized came. This and/or other voice recognition techniques can be used to capture voice commands and selectively filter the voice commands from the user. The voice commands can be combined with the gestures. For example, if the invention were used with CARTO®, the user could say "Point List" and then move his hand up and down to scroll through the points and then make a fist to select a point from the list. In another example, the user could say "Point Viewer" and then use motions to select a channel and change its properties. Also, he could say "Main Map" or "Secondary Map" and then use motions to rotate, zoom and/or pan the map. The client computer performs all the logic in deciding what each motion means in conjunction with the most recently recognized voice command. In one version of this embodiment, some commands may be performed by the use of voice commands only or gestures only, e.g., Acquisition of points in CARTO® can be performed just by saying "Acquire" without the need for a gesture.

Figure 2:
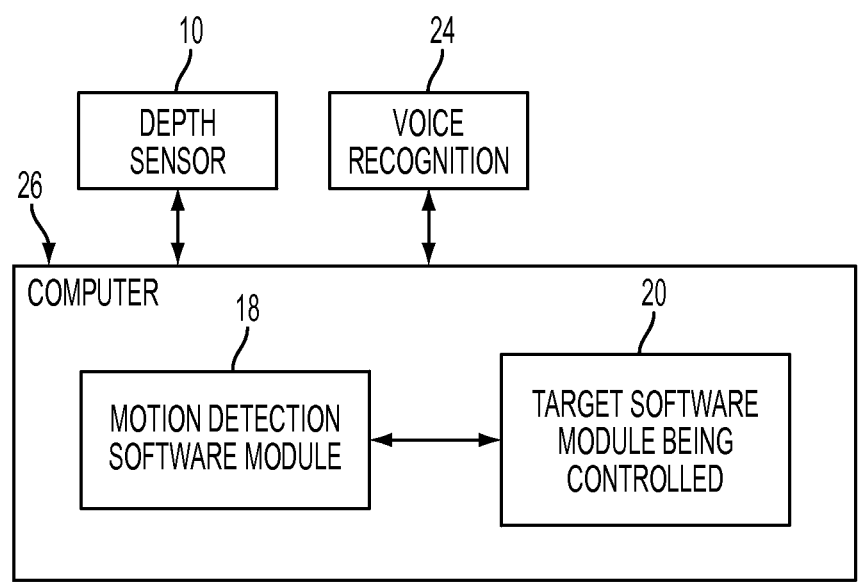
FIG. 2 is a block diagram of another embodiment of the inventive system.

FIG. 2 shows an embodiment having modules of both the CPU and the client computer in one computer 26. The system in the embodiment shown in FIG. 2 has the Depth Sensor 10, Voice Recognition 24, Motion Detection Software Module 18 and Target Software Module 20, having the same functionality as those components in FIG. 1. In this embodiment, however, only one computer 26 is used and the Target Software Module 20 contains a client communication module. The invention is not limited to either the configuration of FIG. 1 or FIG. 2. Multiple CPUs, each having one or more modules, can also be used.

Figure 3:
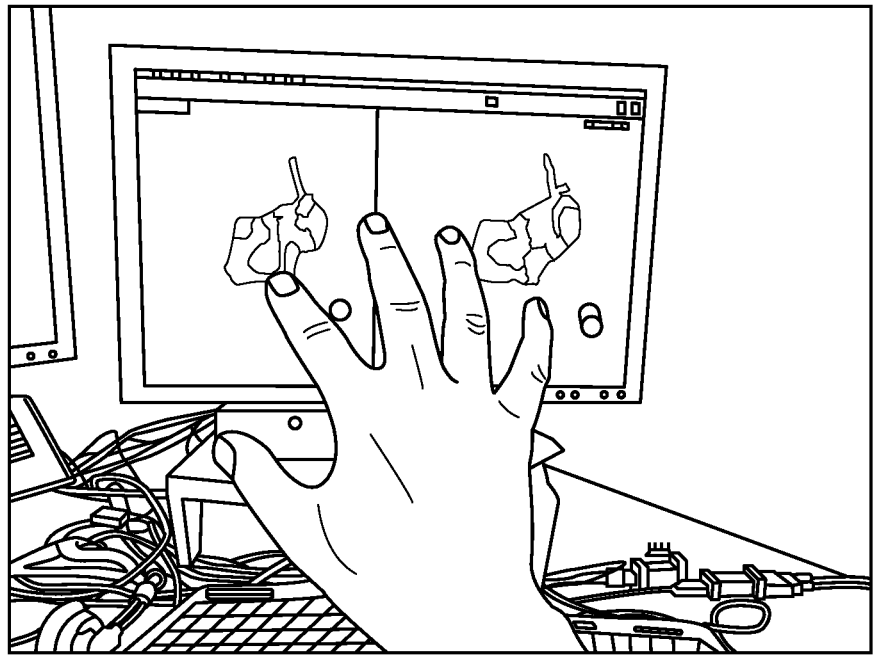
FIG. 3 illustrates a hand motion to initiate control over the CARTO® client.

FIG. 3 shows a user interacting with the system. In FIG. 3, the user waves at the depth sensor which detects the wave. The user's motion, e.g., the wave, is interpreted based on the currently active mode of the client software, e.g., Target Software Module. For example, if the software is in review mode, the wave may rotate the map, or if the software is inactive, the wave may activate it.

Figure 4:
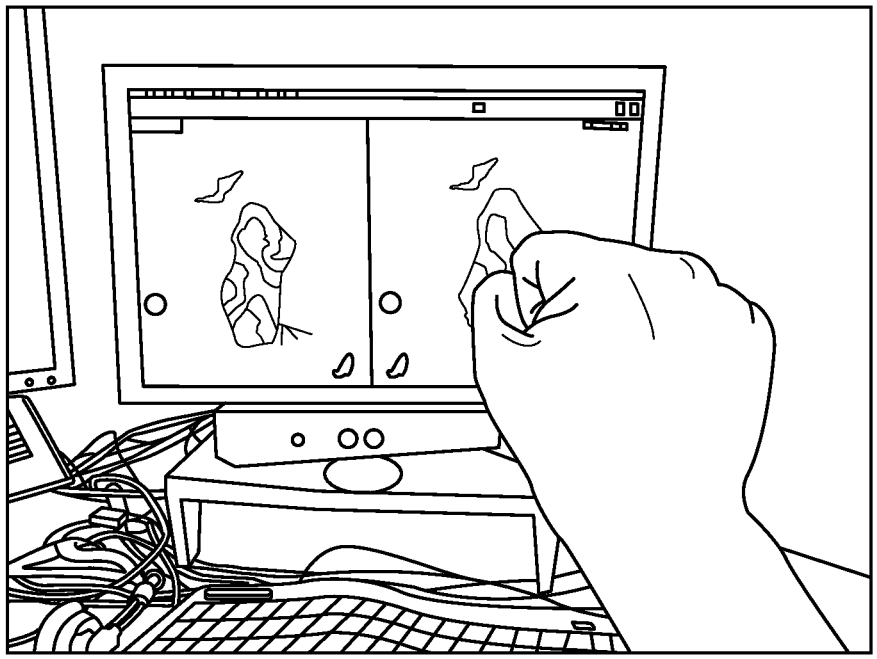
FIG. 4 illustrates a hand motion to perform a function in CARTO® without touching the device.

FIG. 4 shows another user interaction with the system. In FIG. 4, the user makes a fist at the depth sensor which detects that the user's hand has formed a fist. As discussed above, the user's motion is interpreted based on the currently active mode of the client software.

Figure 5:
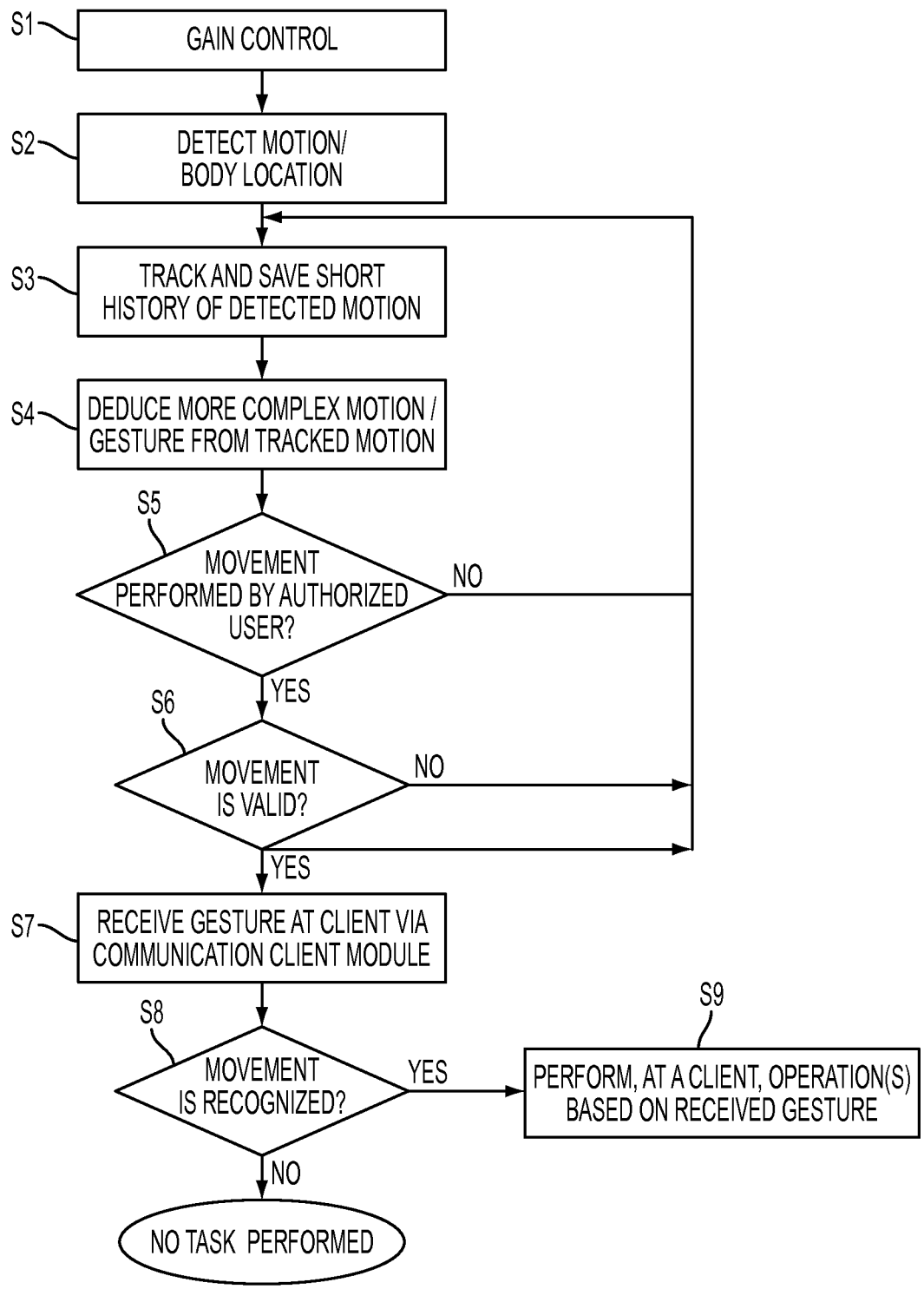
FIG. 5 is a flow diagram of the inventive method.

FIG. 5 is a flow diagram of the inventive method. In step S1, the user gains control of the touch free control system, typically by performing a motion, a voice command or pressing a foot pedal. In step S2, movement, including change of location, is detected by the depth sensor 10 and transmitted to the CPU 12. In step S3, the CPU tracks and saves a short history of the movements and/or location changes. In step S4, the CPU 12 uses the motion software to deduce, from the received motion in accordance with the short history, a more complex movement or gesture. In steps S5 and S6, filtering is performed. In step S5, it is determined whether the gesture is performed by the authorized or proper user by determining whether the movement is within a predicted location and/or by performing facial recognition. If the gesture is determined to be by the authorized user (S5=YES), then processing continues at step S6 where the gesture is validated by the CPU. If the gesture is valid (S6=YES), then it is sent to the client computer and additional motion tracking is resumed at step S3. At step S7, the gesture is received at the communication client module on the client computer. If the gesture is recognized by the active Target Software Module (S8=YES), then, at step S9, the client computer performs a device function or operation, e.g., task, in accordance with the client logic or Target Software Module, based on the deduced gesture. These tasks include, but are not limited to, obtaining different views of the 3D map by zooming, spinning on axis, etc. Once the motion software sends the gesture to the client computer (when S6=YES), the motion software goes back to responding to the next detected motion and/or body location.

In one embodiment, performing an authorized movement also requires determining if the movement is performed in conjunction with hardware such as another device. In this embodiment, an authorized movement must include both a complex movement deduced by the software and an additional action, such as stepping on a foot pedal. This authorization can be performed after step S5, when S5=YES, and before step S6.

If the detected movement is not authorized (S5=NO) or the detected movement is not valid (S6=NO), processing continues at step S3. If the gesture is not recognized by the client software (S8=NO), then no task is performed.

The inventive system advantageously enables tasks to be performed by an operating room device using head tracking and/or other motion detection techniques allowing the doctor or other system user to perform certain actions while still using both of his hands for catheter navigation. Beneficially, the system can filter and forward gestures for allowed personnel only. This ensures that the system is only controlled by the intended people. Hand gestures and head movements and other actions by other people can be ignored.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium is a computer readable storage device, which may be, for example, a magnetic, optical, electronic, electromagnetic, infrared, or semiconductor system, apparatus, or device, or any suitable combination of the foregoing; however, the computer readable storage device is not limited to these examples. Additional particular examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage device.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for touch free operation of a medical 3D mapping system comprising:
    a depth sensor for detecting body motion movements;
    a motion software module operable to receive the detected body motion movements from the depth sensor, the software module being configured to:
    track a series of body motion movements,
    deduce a gesture based on the tracked series of body motion movements,
    filter out invalid body motion movements from the tracked series of body motion movements, the invalid body motion movements resulting from motions that are not performed by the proper user and/or not performed in accordance with predetermined conditions,
    judge whether or not the gesture is authorized, including determining whether the gesture is by a specific user and judging whether the gesture is performed at the same time that a hardware device is operated by an input from the specific user, and
    accept an authorized and valid gesture; and
    a client medical software module operable to receive the accepted gesture at a client computer, determine whether or not the accepted gesture is a recognized gesture for performing a task in accordance with client logic and cause the client computer to perform the task based on the recognized gesture, wherein the task relates to electroanatomical mapping.

2. The system according to claim 1, wherein the client computer is a mapping device and the task is one of rotating a map, zooming in on a map, tilting a map, and panning a map.

3. The system according to claim 1, wherein the tracked series of body motion movements is saved as a history of movements for a user and the judging whether the gesture is authorized is based on the saved history.

4. The system according to claim 3, wherein whether the gesture is authorized includes analyzing differences in location in each frame of the tracked series of body motion movements to determined whether the movements are by the same specific user.

5. The system according to claim 1, wherein judging whether the gesture is authorized includes determining whether the specific user is an authorized user.

6. The system according to claim 5, wherein judging whether the gesture is by an authorized user includes using voice recognition.

7. The system according to claim 5, wherein determining whether the gesture is by an authorized user includes using face recognition.

8. The system according to claim 1, further comprising a client communication module for receiving the accepted gesture at the client computer.

9. The system according to claim 1, wherein the client software module is further operable to use voice recognition for enabling the client to perform the task based on a voice input in conjunction with the accepted gesture.

10. A method for touch free operation of a medical 3D mapping system, comprising:
    detecting body motion movements using a depth sensor;
    tracking a series of body motion movements;
    deducing a gesture based on the tracked series of body motion movements;
    filtering out invalid body motion movements from the tracked series of body motion movements, wherein the invalid body motion movements are a motions that are not performed by the proper user and/or not performed in accordance with predetermined conditions;
    judging whether or not the gesture is authorized, including determining whether the gesture is by a specific user and judging whether the gesture is performed at the same time that a hardware device is operated by the specific user;
    accepting an authorized and valid gesture;
    receiving the accepted gesture at a client computer comprising a medical software module;
    determining whether or not the accepted gesture is a recognized gesture for performing a task in accordance with the client computer logic of the medical software module; and
    causing the client computer to perform the task based on the recognized gesture, wherein the task relates to electroanatomical mapping.

11. The method according to claim 10, wherein the client computer is a mapping device and the task is one of rotating a map, zooming in on the map, tilting a map, and panning the map.

12. The method according to claim 10, wherein the tracked series of body motion movements is saved as a history of movements for a user and the judging whether the gesture is authorized is based on the saved history.

13. The method according to claim 12, wherein whether the gesture is authorized includes analyzing differences in location in each frame of the tracked series of body motion movements to determined whether the movements are by the same specific user.

14. The method according to claim 10, wherein judging whether the gesture is authorized includes determining whether the specific user is an authorized user.

15. The method according to claim 14, wherein judging whether the gesture is by an authorized user includes using voice recognition.

16. The system according to claim 14, wherein determining whether the gesture is by an authorized user includes using face recognition.

17. The method according to claim 10, wherein the accepted gesture is a recognized gesture in accordance with the client logic.

18. The method according to claim 10, further comprising a step of using voice recognition based on a voice input in conjunction with the accepted gesture.

19. A non-transitory computer readable storage device storing a program of instructions executable by a machine to perform a method for touch free operation of a medical 3D mapping system, comprising:
   detecting body motion movements using a depth sensor;
   tracking a series of body motion movements;
   deducing, using a CPU, a gesture based on the tracked series of body motion movements;
   filtering out invalid body motion movements from the tracked series of body motion movements, wherein the invalid body motion movements are motions that are not performed by the proper user and/or not performed in accordance with predetermine conditions;
   judging whether or not the gesture is authorized, including determining whether the gesture is by a specific user and judging whether the gesture is performed at the same time that a foot petal is pressed by the specific user;
   accepting an authorized and valid gesture;
   receiving the accepted gesture at a client computer comprising a medical software module;
   determining whether or not the accepted gesture is a recognized gesture for performing a task in accordance with the client computer logic of the medical software module; and
   causing the client computer to perform the task based on the recognized gesture, wherein the task relates to electroanatomical mapping.

20. The program according to claim 19, wherein the client computer is a mapping device wherein the task is one of rotating a map, zooming in on the map, tilting a map, and panning the map.

21. The program according to claim 19, wherein the series of body motion movements is saved as a history of movements for a user and the judging whether the gesture is authorized is based on the saved history.

22. The program according to claim 19, wherein whether the gesture is authorized includes analyzing differences in location in each frame of the tracked series of body motion movements to determined whether the movements are by the same specific user.

23. The non-transitory computer readable storage device according to claim 22, wherein judging whether the gesture is by an authorized user includes using voice recognition.

24. The program according to claim 19, further comprising using voice recognition based on a voice input in conjunction with the accepted gesture.

25. The non-transitory computer readable storage device according to claim 22, wherein determining whether the gesture is by an authorized user includes using face recognition.

* * * * *